United States Patent [19]
Sugiyama

[11] Patent Number: 5,748,787
[45] Date of Patent: May 5, 1998

[54] HIERARCHY TYPE ENCODING/DECODING APPARATUS

[75] Inventor: Kenji Sugiyama, Yokosuka, Japan

[73] Assignee: Victor Company of Japan, Ltd., Yokohama, Japan

[21] Appl. No.: 446,319

[22] Filed: May 22, 1995

Related U.S. Application Data

[63] Continuation of Ser. No. 83,188, Jun. 29, 1993, abandoned.

[30] Foreign Application Priority Data

Jun. 29, 1992 [JP] Japan ................. 4-194975

[51] Int. Cl.$^6$ ........................................... G06T 9/00
[52] U.S. Cl. ........................ 382/240; 382/233; 382/236; 348/398; 348/407; 348/424
[58] Field of Search ........................ 382/240, 233, 382/236; 348/384, 398, 408, 409, 392, 424, 427, 431, 407

[56] References Cited

U.S. PATENT DOCUMENTS

| | | | |
|---|---|---|---|
| 4,780,760 | 10/1988 | Waldman et al. | 348/397 |
| 4,849,810 | 7/1989 | Ericsson | 348/416 |
| 4,969,204 | 11/1990 | Melnychuck et al. | 348/408 |
| 5,067,015 | 11/1991 | Cambridge et al. | 348/398 |
| 5,173,773 | 12/1992 | Ueda et al. | 348/407 |
| 5,216,719 | 6/1993 | Oh | 348/398 |
| 5,337,089 | 8/1994 | Fisch | 348/446 |

FOREIGN PATENT DOCUMENTS

| | | |
|---|---|---|
| 0 465 732 A1 | 1/1992 | European Pat. Off. . |
| 4-177992 | 6/1992 | Japan . |
| 4-322593 | 11/1992 | Japan . |

OTHER PUBLICATIONS

Delogue et al. "Compatible Coding of Digital Interlaced HDTV." IEEE Journal on Selected Areas in Communications, vol. 11, No. 1, pp. 146–152, Jan. 1993.

Abstract of JP 4–177992 (English language) (see "AL" above).

Abstract of JP 4–322593 (English language) (see "AM" above).

Abstract of JP 4–328982 (English language).

Burt et al. "The Laplacian Pyramid as a Compact Image Code." IEEE Trans. on Comm., vol. COM-31, No. 4, Apr. 1983, pp. 532–540.

*Primary Examiner*—Joseph Mancuso
*Assistant Examiner*—Jon Chang
*Attorney, Agent, or Firm*—Jacobson, Price, Holman & Stern, PLLC

[57] ABSTRACT

A hierarchical encoding/decoding apparatus corresponds to imaging systems having mutually different resolutions. The apparatus constitutes an entire band width apparatus by using two encoding/decoding devices each for a low band width processing. In the low band width, the apparatus sub-samples a signal only in a vertical direction, while the apparatus sub-samples the signal only in a horizontal direction in a high band width. Accordingly, since sampling numbers are the same each other both in the low and high band widths, a processing amount in the high band width becomes similar to a processing amount in the low band width.

6 Claims, 10 Drawing Sheets

HIERARCHY TYPE ENCODING/DECODING APPARATUS

This is a continuation of application Ser. No. 08/083,188, filed Jun. 29, 1993 which was abandoned upon the filing hereof.

BACKGROUND OF THE INVENTION

The present invention relates to a hierarchy type encoding/decoding apparatus which codes/decodes signals high-efficiently by using smaller code amount in recording, transmission and display system for performing a digital signal processing, and more particularly to a hierarchy type encoding/decoding apparatus for performing a hierarchical coding in correspondence with a plurality of systems having the different resolutions one another.

There is first described a hierarchical coding below.

There is a method of high-efficiently coding images corresponding to systems which have respectively different resolutions, and when resolution is low, this method is performed by previously and hierarchically coding images in order to decrease a data amount and a processing amount to be decoded. In detail, image data of low resolution are obtained by coding an original image after sub-sampling, and differential data additionally used for high resolution are obtained by coding a differential signal which is generated by subtracting from the original image an image having the same sampling number as the original image by interpolating the sub-sampled image.

An image of low resolution is obtained by decoding only the image data of low resolution, while an image of high resolution is obtained by making the sampling number of the decoded image data of low resolution the same as that of the original image by interpolation to get an original image signal, by decoding the differential data to make a differential signal, and by adding the differential signal to the original image signal. When the differential signal is made by using the image of low resolution which is locally decoded at hierarchically coding, it is possible to compensate an error occurring in coding/decoding an image of low resolution by means of coding/decoding of the differential signal.

Such a method of hierarchically coding/decoding is also called as a pyramid coding, in which a sampling number of the coded signal becomes more than that of the original image.

There is described a coding apparatus below.

FIG. 1 shows a configuration of a conventional coding apparatus. An inputted signal through an image input 1 is sub-sampled to halves in the vertical and horizontal directions, respectively, by a two-dimensional sub-sampler 71 after bandwidths of the inputted signal are limited to halves in the vertical and horizontal directions.

The sub-sampled signal is processed a discrete cosine transformation (DCT) by a discrete cosine transformer (DCT) 3, and a transformed signal is quantized by a quantizer 4. The quantized signal is compressed by a variable length encoder 5 to make data of low band width, thereby to output them through an L-data output 6.

On the other hand, the sub-sampled signal is delivered to a two-dimensional over-sampler 72, in which the signal is interpolated in the vertical and horizontal directions to make an over-sampled signal having a sampling number as the same as the inputted signal. Even though the over-sampled signal has the same sampling number as the inputted signal, a frequency component is limited to a half of the inputted signal in the vertical and horizontal directions.

A subtracter 8 receives the over-sampled signal at a subtracting input thereof and the inputted signal at a subtracted input thereof, and outputs a subtraction result as a high band width signal. A frequency component of the high band width signal has a low frequency portion suppressed in the vertical and horizontal directions.

The high band width signal is made as high band width data through a DCT 10, a quantizer 11 and a variable length encoder 12, thereby to be outputted from an H-data output 13. Even though operation of the DCT 10, quantizer 11 and variable length encoder 12 is the same as the DCT 3, quantizer 4 and variable length encoder 5, a data processing amount of them becomes four times because the encoded sampling number is four times.

The total encoded sampling number is one and quarter times as large as the case where the inputted signals are coded as they are, without using the hierarchical coding, because there is duplication of a sub-sampled coded element and a coded element without sub-sampling.

FIG. 3 shows a frequency constitution of the high and low band widths. In the figure, μ denotes a horizontal frequency, ν does a vertical frequency, fh does the maximum horizontal frequency, and fv does the maximum vertical frequency. In FIG. 3, the low band width is included in the high band width, and entire low band width duplicates over the high band width. In the duplicated portion of the high band width over the low band width, the high band width signal has only distortion components due to deterioration of the frequency characteristics caused by sub-sampling and over-sampling processing. Accordingly, an encoded data amount does not become one and quarter times as large as the inputted signal, and it becomes only little more than the case where a hierarchical coding is not performed.

Lastly, there is described a decoding apparatus.

FIG. 2 shows a configuration of a conventional decoding apparatus. With respect to the low band width data through an L-data input 21, a variable length decoder 22 returns the variable length code to a fixed length code of the data, and an inverse quantizer 23 converts the code into a quantized representation value which will be made a reproduced low band width signal by inverse transformation of discrete cosine by means of an inverse discrete cosine transformer 24. Since an output of the inverse DCT 24 is sub-sampled, a two-dimensional over-sampler 72 interpolates the output of the inverse DCT 24 to return the same sampling number as that of an inverse DCT 30.

In the same manner, a high band width data through an H-data input 27 are made as a reproduced high band width signal through a variable length decoder 28, an inverse quantizer 29 and an inverse DCT 30. The reproduced high band width signal is added with the output of the two-dimensional over-sampler 72 as the low band width signal by an adder 25, thereby to be outputted a reproduced image signal through an image output 26.

Here, the low band width signal as the output of the inverse DCT 24 is reproduced as an image having low resolution, which can be taken out by its own image. In this case, since data to be used are only the L-data, it is unnecessary to provide the two-dimensional over-sampler 72, variable length decoder 28, inverse quantizer 29 and inverse DCT 30. By such a hierarchical type encoding, signals having different resolutions can be decoded reasonably.

Since the sampling number of the high band width is certainly larger than the number of the low band width in the conventional hierarchical coding, an unbalance occurs in the processing amounts between the high and low band widths, so that it is necessary to provide apparatus having different processing capabilities for low and high band widths, respectively. Accordingly, a processing capability is not made the most thereof when the high band width apparatus is used for the low band width, the low band width apparatus lacks the processing capability in the high band width processing. Also, a constitution becomes complicated when a time sharing processing of the high and low band widths is performed.

SUMMARY OF THE INVENTION

The present invention is conceived in view of the above-points, and has an object to provide a hierarchical coding/decoding apparatus which can reasonably utilize an entire systematization by using two coding/decoding devices each having only low band width processing capability, in which the processing amounts in the high and low band widths are the same as each other by equalizing the sampling numbers in the high and low band widths in the manner that the data in the low band width are sub-sampled only in the vertical direction and the data in the high band width are sub-sampled in the horizontal direction.

In order to achieve the above object, a hierarchical type coding apparatus according to the present invention and for hierarchically coding images, comprises first sub-sampling means for sub-sampling an inputted signal to output a first signal to be coded, first encoding means for coding the first signal to output first coded data, over-sampling means for interpolating the first signal to output an over-sampled signal having a sampling number as the same as the inputted signal, subtracting means for subtracting the over-sampled signal from the inputted signal to output a differential signal, second sub-sampling means for sub-sampling the difference signal in the manner of enlarging a sampling number more than the first signal in one direction of horizontal and vertical directions and for sub-sampling the difference signal in the manner of enlarging a sampling number in another direction of the horizontal and vertical directions to output a second signal to be coded, and second encoding means for coding the second signal to output second coded data.

Furthermore, the hierarchical coding apparatus above-described includes local portion decoding means for decoding the first coded data to output a local decoded signal, wherein the over-sampling means interpolates the local decoded signal to output the over-sampled signal having the same sampling number as the inputted signal.

Still furthermore, a hierarchical decoding apparatus for decoding a hierarchical encoded image, comprises first decoding means for decoding the first coded data from the hierarchical encoding apparatus to output a first decoded signal, first over-sampling means for interpolating the first decoded signal to output a first over-sampled signal having the same sampling number of a reproduced signal, second decoding means for decoding the second coded data from the hierarchical encoding apparatus to output a second decoded signal, second over-sampling means for interpolating the second decoded signal to output a second over-sampled signal having the same sampling number of a reproduced signal, and adding means for adding the first over-sampled signal with the second over-sampled signal to output the reproduced signal.

By using the hierarchical encoding/decoding apparatus having the above configuration, it is possible to equalize processing amounts in the high and low band widths by equalizing sampling numbers in the high and low band widths in the manner that the low band width is sub-sampled in the vertical direction, and the high band width is sub-sampled in the horizontal direction. Accordingly, since this invention can constitute the entire apparatus by using two coding/decoding devices each having the processing capability for the low band width, it is possible to reasonably realize both the device for the low band width and the device for the entire band width.

On the other hand, frequencies in the high and low band widths duplicate within the low frequency portion in both the horizontal and vertical directions, and the frequency within this portion is a half of the low and high band widths, respectively. High frequency portions (slant high band width) both in the horizontal and vertical directions are not transmitted both in the high and low band widths, and a visual importance of its band width is low, thereby making encoding/decoding resonable.

Since the band width in the high portion becomes more narrow, a data amount decreases to a half of the low portion. Accordingly, a data amount of the entire band width is one and half times as large as that of only low band width.

As described above, since the hierarchical encoding/decoding apparatus according to the present invention sub-samples the low band width in the vertical direction and the high band width in the horizontal direction, it is possible to equalize the sampling numbers in both the low and high band widths to the same number, thereby equalizing the processing amounts in the high and low band widths. Accordingly, the entire band width apparatus can be utilized by using two encoding/decoding devices having processing capability for the low band width. Therefore, if a plurality of the encoding/decoding devices are made, it is possible to reasonably utilize them for both the low band width and the entire band width, thereby reducing the manufacturing cost for the devices.

Furthermore, since encoding is not performed with respect to the high frequency component in the slant direction which is a low visual importance, the sampling number of the encoded signals is the same as the case where the hierarchical encoding is not performed, thereby realizing the same processing amount for encoding/decoding.

As above-mentioned, the hierarchical encoding/decoding apparatus according to the present invention has an extremely excellent effect in the practical use.

DETAILED DESCRIPTION OF THE PREFERRED EMBODIMENTS

There will now be described the preferred embodiments of the present invention in accordance with the attached drawings.

At first, an encoding apparatus according to a first embodiment is described.

Figure 1:
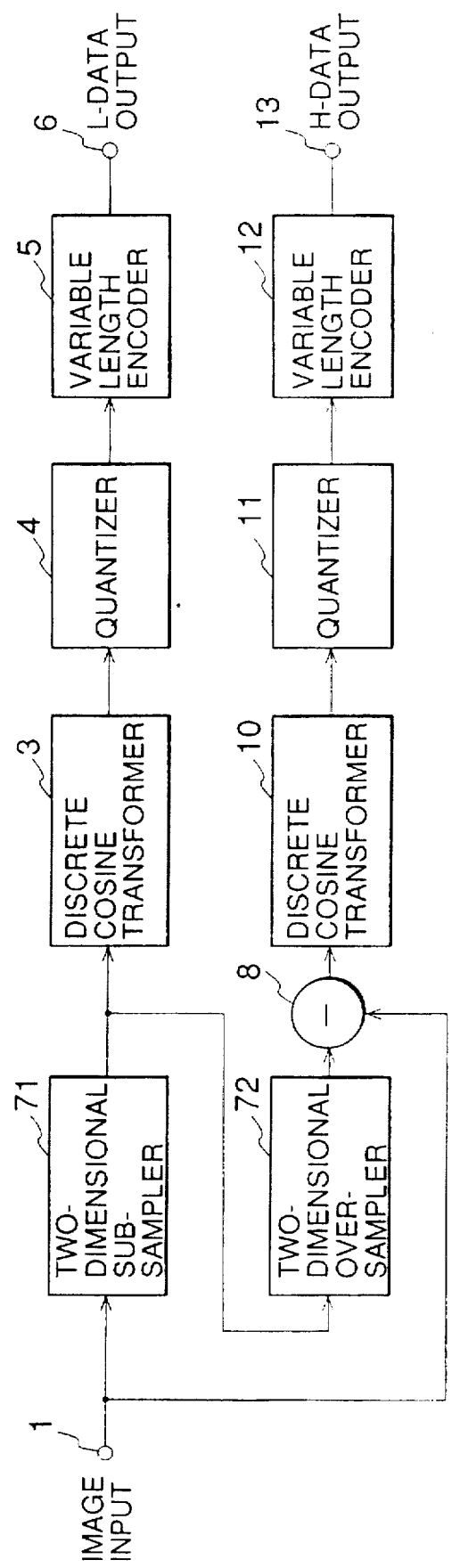
FIG. 1 is a block diagram showing an example of a conventional hierarchical encoding apparatus.
Figure 4:
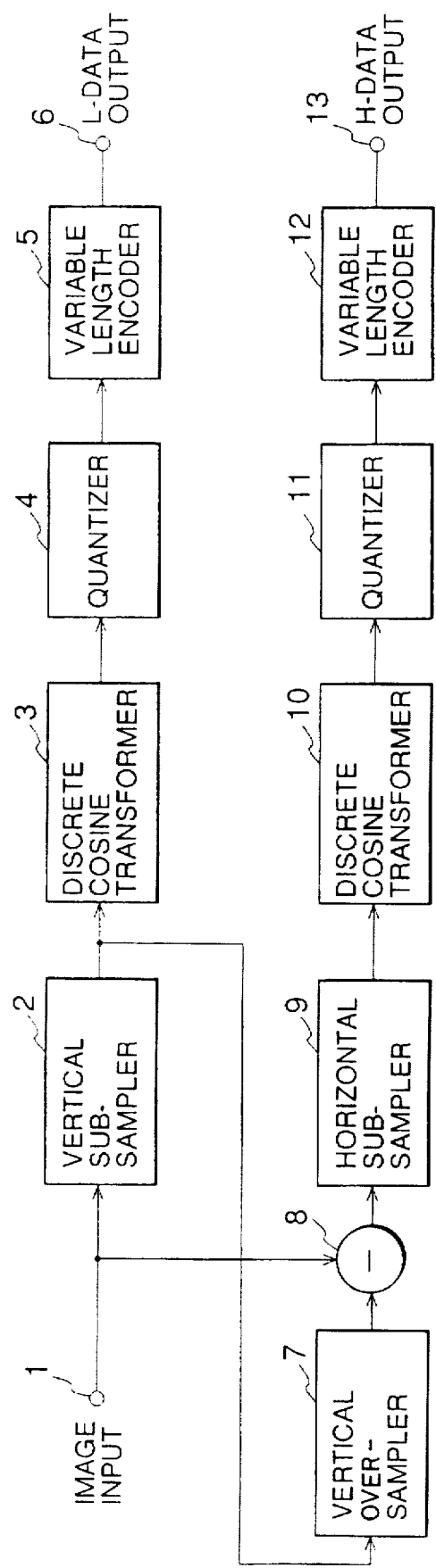
FIG. 4 is a block diagram showing a configuration of a hierarchical encoding apparatus according to a first embodiment of the present invention.

FIG. 4 is a block diagram showing a hierarchical encoding apparatus according to the first embodiment of the present invention. In this figure, the same components shown in FIG. 1 are denoted by the same numerals. Different portions in comparison with the conventional encoding apparatus shown in FIG. 1 are, a vertical sub-sampler 2 in the place of the two-dimensional sub-sampler 71, a vertical over-sampler 7 in the place of the two-dimensional sub-sampler 72, and a horizontal sub-sampler 9 which is newly added.

In FIG. 4, an inputted signal through the image input 1 is limited in band width to a half in the vertical direction by the vertical sub-sampler 2, and is sub-sampled to a half. The sub-sampled signal becomes the compressed data in the same manner of the conventional encoding apparatus through the DCT 3, quantizer 4 and variable length encoder 5 to be outputted through the L-data output 6.

On the other hand, the sub-sampled signal is also delivered to the vertical over-sampler 7. The vertical over-sampler 7 interpolates the sub-sampled signal in the vertical direction for returning the sampling number as the same as the inputted signal to output an over-sampled signal to the subtracter 8. The subtracter 8 receives the over-sampled signal as the subtracting input, and the inputted signal as the subtracted signal, thereby outputting the subtracting result as the high band width signal.

The high band width signal is limited to a half in the horizontal direction, and is sub-sampled to a half by the horizontal sub-sampler 9. The sub-sampled high band width signal is coded through the DCT 10, quantizer 11 and variable length encoder 12 to be outputted as H-data through the H-data output 13.

Here, both of an output of the vertical sub-sampler 2 and an output of the horizontal sub-sampler 9 have a half the sampling number of the original signal. Accordingly, the processing amount for the low band width by the DCT 3, quantizer 4 and variable length encoder 5, is the same as the processing amount for the high band width by the DCT 10, quantizer 11 and variable length encoder 12. A total encoded sampling number is the same as the original signal which is obtained by adding a half with a half and is less than the conventional encoding apparatus.

Figure 10:
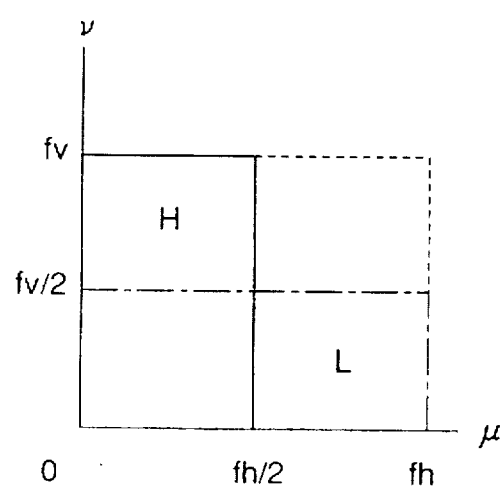
FIG. 10 is a characteristic diagram showing a band constitution in the respective embodiments according to an encoding/decoding apparatus of the present invention.

There is shown in FIG. 10 a condition between the high and low band widths in this embodiment. The components in the portion where the frequencies are low in both the horizontal direction and the vertical direction are present in both the H-data and the L-data, while the components (slant high-frequency components) in the portion where the frequencies are high in both the horizontal direction and the vertical direction are absent in both the H-data and the L-data. Accordingly, the quality of this reproduced image is not similar to that of the case where the hierarchical encoding is not performed. But, the components in the portion where the frequencies are high in both the vertical direction and horizontal direction do not have the visual importance because these portions are often suppressed in the band width compression in an analog transmission.

There is described a decoding apparatus according to the first embodiment of the present invention.

Figure 2:
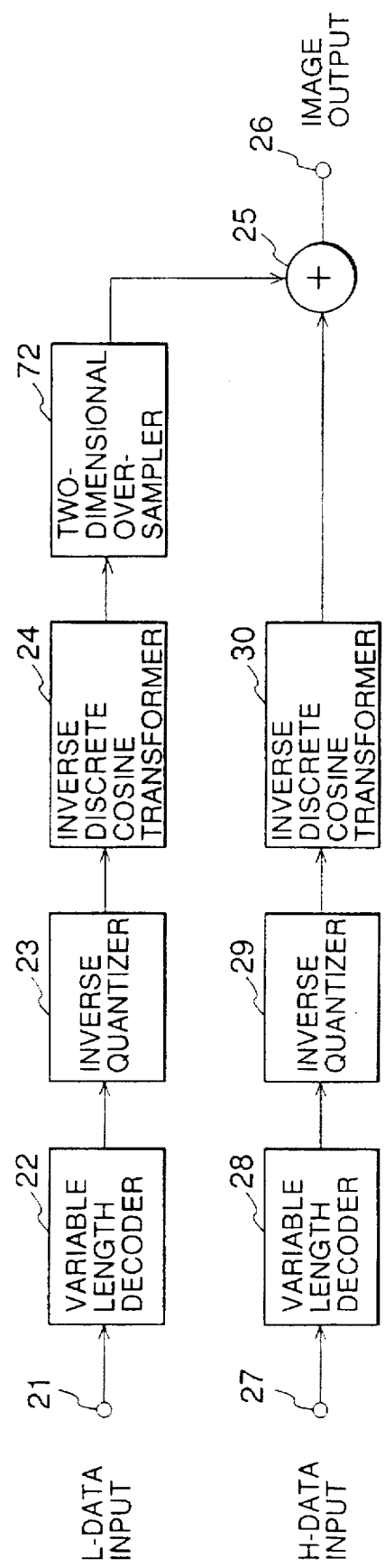
FIG. 2 is a block diagram showing an example of a conventional hierarchical decoding apparatus.
Figure 3:
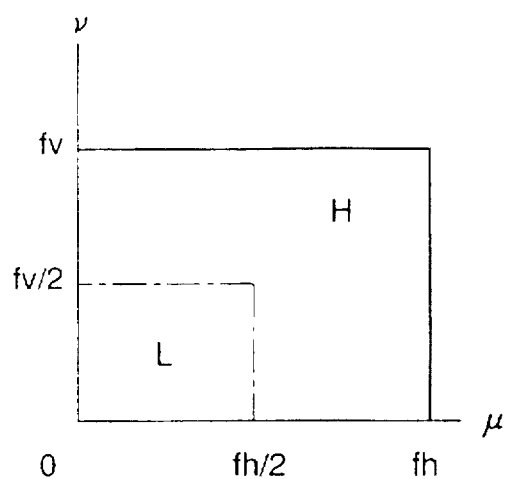
FIG. 3 is a characteristic diagram showing a band constitution in the conventional encoding/decoding apparatus.
Figure 5:
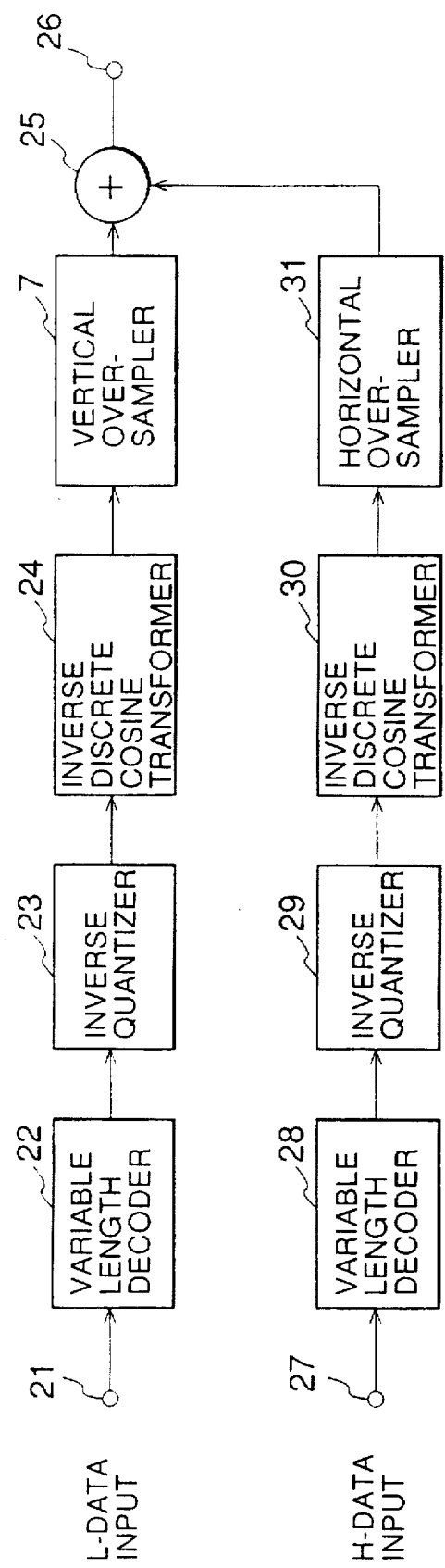
FIG. 5 is a block diagram showing a configuration of a hierarchical decoding apparatus according to a first embodiment of the present invention.

FIG. 5 shows a constitution of the decoding apparatus corresponding to the encoding apparatus shown in FIG. 4. The same components of the conventional apparatus shown in FIG. 2 are denoted as the same numerals. The apparatus shown in FIG. 5 is different from the decoding apparatus shown in FIG. 2 at the points of a vertical over-sampler 7 in the place of the two-dimensional over-sampler 72, and a horizontal over-sampler 31 which is newly added.

The L-data inputted through the L-data input 21 are decoded by the variable length decoder 22, inverse quantizer 23 and inverse DCT 24 in the same manner of the conventional apparatus, thereby returning the same number as the original image.

In the same manner, the H-data through the H-data input 27 are decoded by the variable length decoder 28, inverse quantizer 28 and inverse DCT 29 through the same steps of the conventional apparatus, thereby returning the same number as the original image.

The adder 25 adds both the outputs of the vertical over-sampler 7 and horizontal over-sampler 31 to output an additional signal as a reproduced image signal through the image output 26.

If only the low band component is taken out as the output of the inverse DCT 24, data need only L-data and it is sufficient to provide the variable length decoder 22, inverse quantizer 23 and inverse DCT 24 as the same manner of the conventional example.

At this time, since the coded sampling numbers in the high and low band widths are the same as each other, the decoding unit in the low band width (the variable length decoder 22, inverse quantizer 23 and inverse DCT 24) becomes the same as the decoding system in the high band width (the variable length decoder 28, inverse quantizer 29 and inverse DCT 30), thereby resulting a processing amount two times as large as that of the case where only the decoding system of low band width is provided. Accordingly, if the decoding apparatus is constituted by the device of the low band width, two of the apparatus can correspond to the entire band width. Therefore, it is possible to provide a reasonable system constitution corresponding to such different resolutions.

There is described a coding apparatus according to a second embodiment of the present invention.

Figure 6:
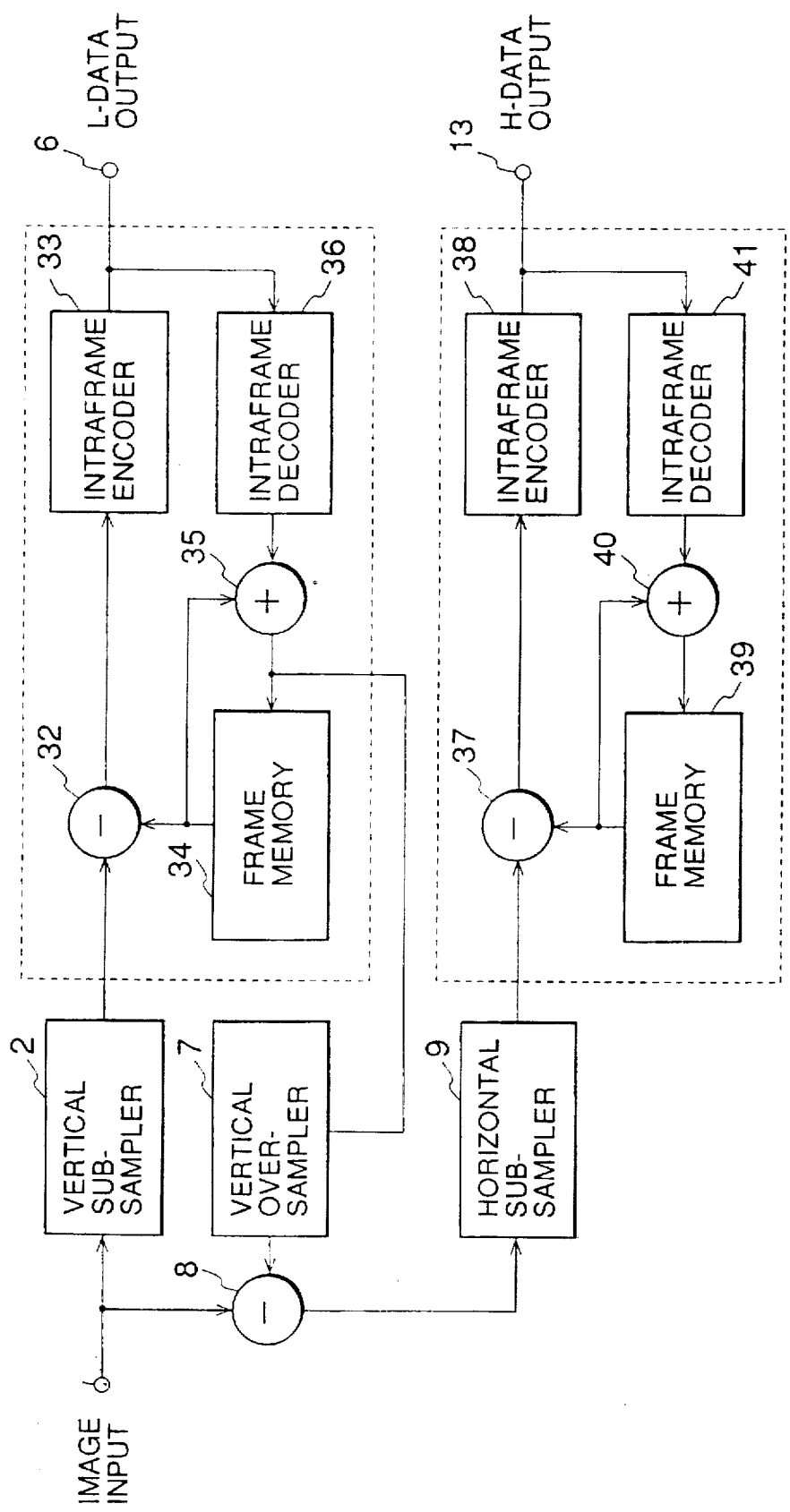
FIG. 6 is a block diagram showing a configuration of a hierarchical encoding apparatus according to a second embodiment of the present invention.

FIG. 6 shows a block diagram of the hierarchical coding apparatus according to the second embodiment of the present invention. A first difference between the first and second embodiments resides in that interframe prediction is performed with the moving picture. A second difference is that the hierarchical processing of the second embodiment uses the images which are locally decoded, but the hierarchical processing is not performed before the coding processing.

The inputted signal through the image input 1 is limited to a half in the vertical direction by the vertical sub-sampler 2 and sub-sampled to a half. A predictive subtracter 32 subtracts a predictive signal of a frame memory 34 from the low band width signal of the limited and sub-sampled signal to output a subtract signal to an intraframe encoder 33 as a predictive residual signal. Since the intraframe encoder 33 has a constitution substantially same as the combination of the DCT 3, quantizer 4 and variable length encoder 5, the predictive residual signal becomes the compressed data which are outputted through the L-data output 6 and which are delivered to an intraframe decoder 36 at the same time.

Since the intraframe decoder 36 has a constitution substantially same as the combination of the variable length decoder 22, inverse quantizer 23 and inverse DCT 24, the data become a reproduced predictive residual signal which is delivered to an adder 35. The adder 35 adds the reproduced predictive residual signal with the output of the frame memory 34 and supplies the reproduced image signal to the frame memory 34. The frame memory 34 delays the reproduced image for one frame and supplies a predictive signal to the predictive subtracter 32 and the adder 35.

On the other hand, the output of the adder 35 as the reproduced image is also delivered to the vertical over-sampler 7. Operation of the vertical over-sampler 7, subtracter 8 and sub-sampler 9 is the same as that shown in FIG. 4. An interframe predictive coding of an output of the sub-sampler 9 is performed by a predictive subtracter 37, an intraframe encoder 38, an intraframe decoder 39, an adder 40 and a frame memory 39 in the same manner of processing in the low band width, thereby outputting the interframe predictive coding signal through an H-data output 13.

In such a manner, even though the signal delivered to the over-sampler 7 is the same as that shown in FIG. 4 as the matter of formal, the inputted signal is not sub-sampled, as to which the coded and decoded reproduced image is used. In this case, a quantization error occurring in coding and decoding in the low band width is compensated in the high band width. The local decoding is generally performed even in the case where the intraframe predictive coding is not performed in the hierarchical manner, thereby using the reproduced image in non-hierarchical manner.

There is described a decoding apparatus according to the second embodiment of the present invention.

Figure 7:
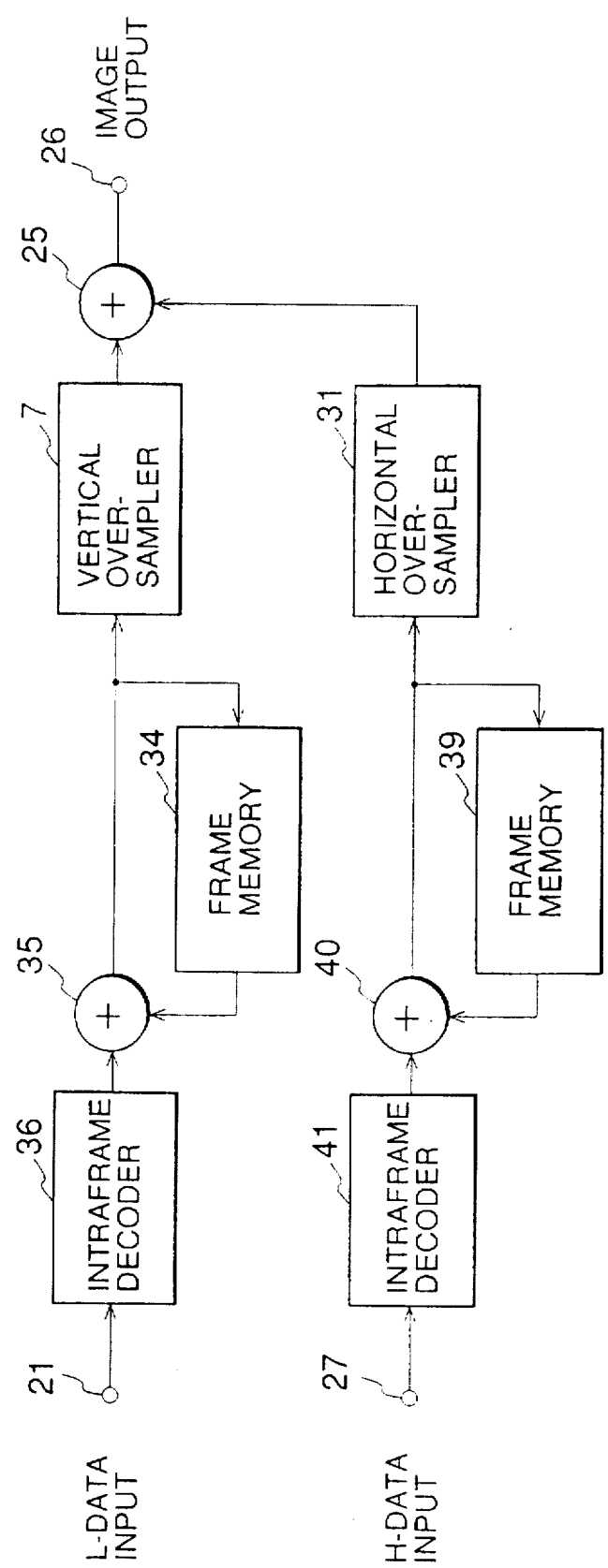
FIG. 7 is a block diagram showing a configuration of a hierarchical decoding apparatus according to a second embodiment of the present invention.

FIG. 7 shows the decoding apparatus according to the second embodiment of this invention corresponding to the encoding apparatus shown in FIG. 6. The components of the first embodiment shown in FIG. 5 are represented by the same numerals in FIG. 7. The different portions between FIG. 5 and FIG. 7 are to provide adders 35 and 40 and frame memories 34 and 39.

In FIG. 7, operation of the adders 35 and 40, the frame memories 34 and 39, and intraframe decoders 36 and 41 is the same as that shown in FIG. 6. The outputs of the adders 35 and 40 are interpolated by the vertical over-sampler 7 and the horizontal over-sampler 31, and an addition is performed, thereby outputting as the reproduced image through the image output 26.

In such a manner, even though the hierarchical processing is performed from the reproduced image in the decoding apparatus, it is no problem particularly. Since the sampling numbers in the high and low band widths are the same as each other, a processing amount and memory amount in the decoding apparatus in the low band width (the adder 35, frame memory 34, and intraframe decoder 36) are the same as those in the high band width (the adder 40, frame memory 29, and intraframe decoder 41).

There is described a coding apparatus according to a third embodiment of the present invention.

Figure 8:
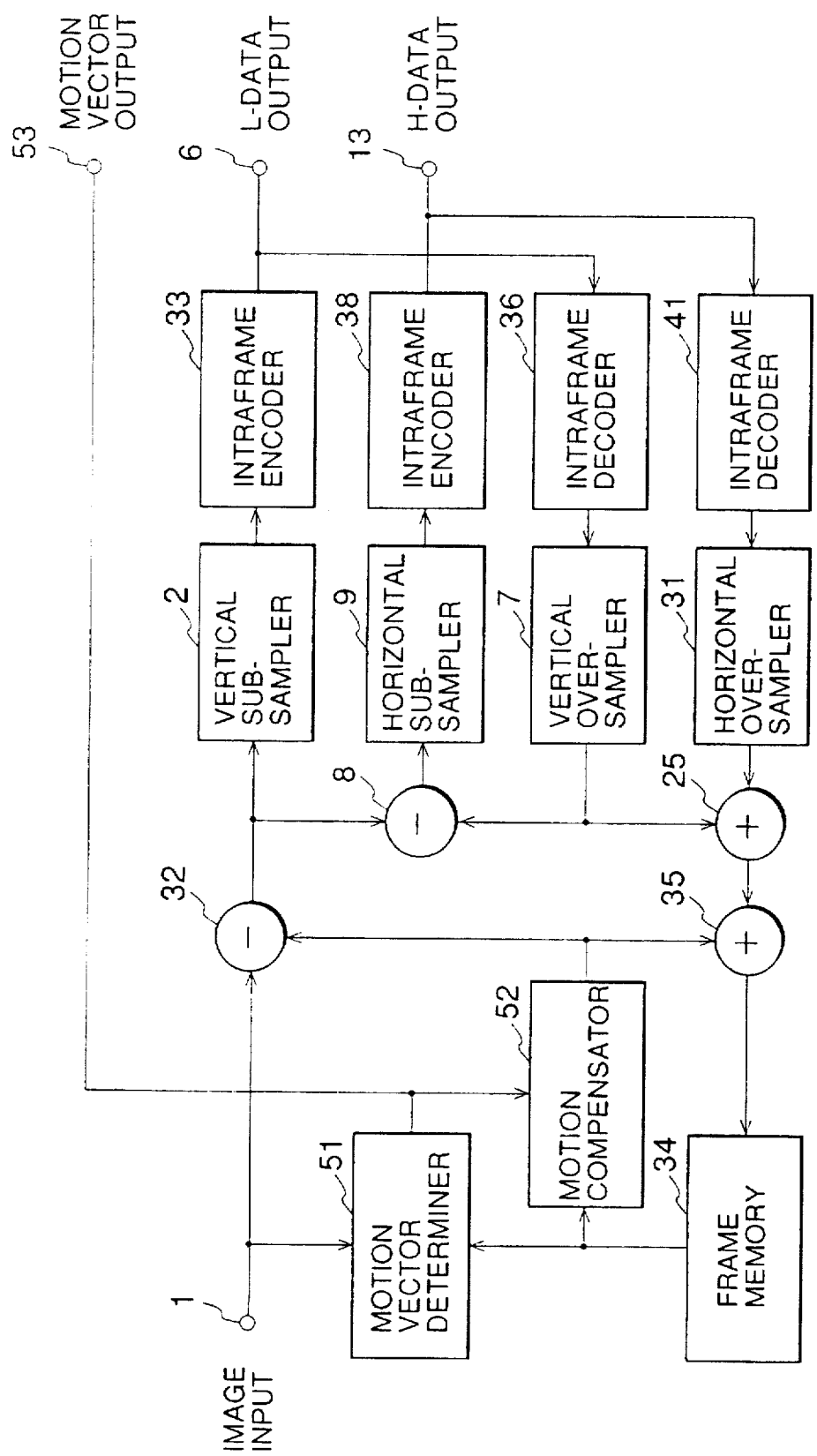
FIG. 8 is a block diagram showing a configuration of a hierarchical encoding apparatus according to a third embodiment of the present invention.

FIG. 8 is a block diagram showing the coding apparatus according to the third embodiment of this invention. The components same as those of the second embodiment shown in FIG. 6 are represented by the same numerals.

The different portions between FIG. 6 and FIG. 8 reside in that there is a motion compensation interframe prediction coding in which an interframe processing is not performed by hierarchical manner, and only an intraframe processing is performed by hierarchical manner. Since the motion compensation processing can be predicted more properly by performing it in the condition of the precise sampling density, the motion compensation processing is performed in the above-manner before sub-sampling is performed. A motion vector (MV) determiner 51 and a motion compensator 52 are newly provided and the predictive subtracter 32 and the frame memory 34 are provided by one, respectively.

The predictive subtracter 32 subtracts a predictive signal delivered by the motion compensator 52 from an image signal inputted through the image input 1, thereby supplying a predictive residual signal to the vertical sub-sampler 2 and subtracter 8. A low band width processing is performed in the vertical sub-sampler 2, intraframe encoder 33, intraframe decoder 36 and the vertical over-sampler 7. The coded data in the low band width are outputted through the L-data output 6, and the reproduced residual signal in the low band width is delivered to the subtracter 8 and the adder 25.

The subtracter 8 outputs the high band width signal of the predictive residual signal, and the horizontal sub-sampler 9, intraframe encoder 38, intraframe decoder 41 and horizontal over-sampler 31 perform the high band width processing. The encoded data in the high band width are outputted through the H-data output 13, and the high band width residual signal is delivered to the adder 25. The adder 25 adds the signals in the high and low band widths to obtain the reproduced predictive residual signal to deliver it to the adder 35.

The adder 35 adds the predictive residual signal with the predictive signal supplied from the motion compensator 52 to produce the reproduced image, thereby supplying it to the frame memory 34. The frame memory 34 delays the reproduced image for one frame to supply it to the MV determiner 51 and the motion compensator 52.

The MV determiner 51 determines the motion vector (MV) in every blocks on the basis of the inputted signal and the output signal of the frame memory 34 to output it to the motion compensator 52.

The motion compensator 52 obtains the image signal previous to one frame of which the motion is compensated corresponding to the motion vector, to supply it to the predictive subtracter 32 and the adder 35. Since the motion vector data is necessary to the decoding side, the data are outputted through the motion vector output 53 to the decoding side.

There is described a decoding apparatus according to the third embodiment of the present invention.

Figure 9:
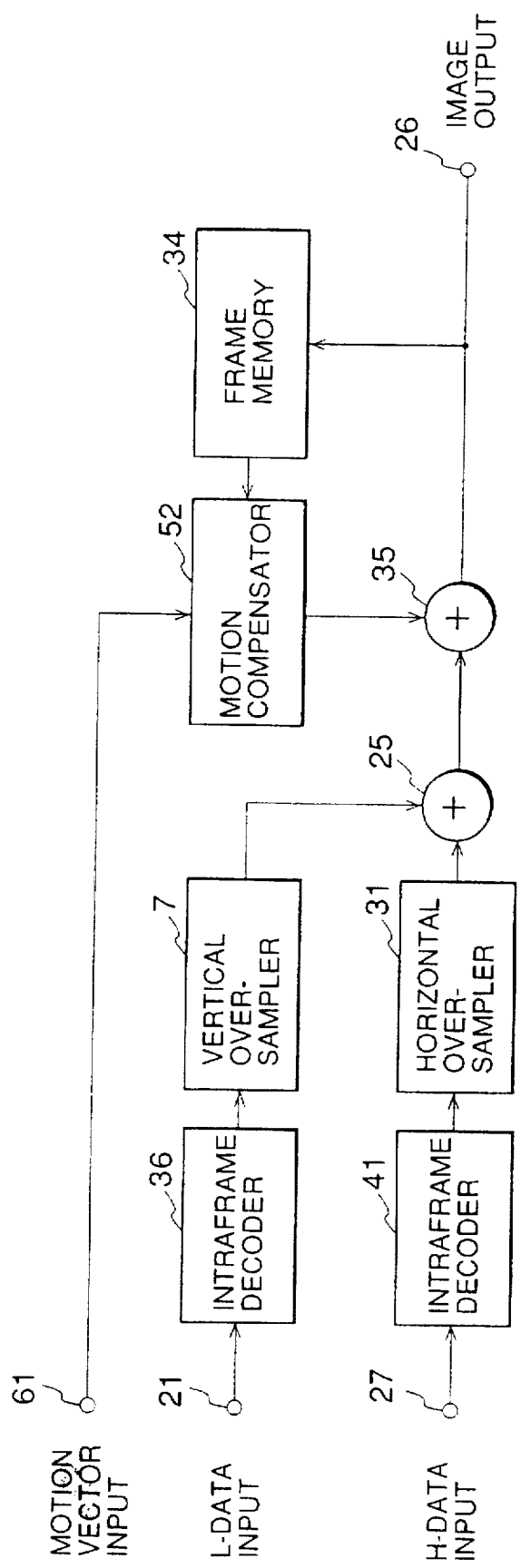
FIG. 9 is a block diagram showing a configuration of a hierarchical decoding apparatus according to a third embodiment of the present invention.

FIG. 9 is a block diagram showing the decoding apparatus of this invention corresponding to the encoding apparatus shown in FIG. 8. The components in FIG. 9 as the same as the portions in FIG. 7 are represented by the same numerals. The difference between the decoding apparatus shown in FIGS. 7 and 9 resides in that the decoding apparatus shown in FIG. 9 has a motion compensator 52.

In FIG. 9, the outputs of the intraframe decoders 36 and 41 are respectively interpolated by the vertical over-sampler 7 and horizontal over-sampler 31, and added to each other in the adder 25, the output being supplied to the adder 35.

Operation of the adder 35 motion compensator 52 and frame memory 34 is the same as that of the coding apparatus shown in FIG. 8. The output of the adder 35 is terminated from the image output 26 as the reproduced image signal.

Even though it is unnecessary for the intraframe decoder 41, horizontal over-sampler 31 and adder 25 to take out only the low band width, which the adder 35, motion compensator 52 and frame memory 34 need for inter-image predictive processing.

What is claimed is:

1. A hierarchical encoding apparatus for hierarchically encoding an image, comprising first sub-sampling means for sub-sampling an input signal in a first direction of two directions consisting of a vertical direction and a horizontal direction, to output a first coded signal containing a number of signal samples which is fewer than a number of signal samples in said input signal;

first encoding means for encoding said first coded signal to output first coded data;

first over-sampling means for interpolating said first coded signal in said first direction to output an over-sample signal containing the same number of signal samples as said input signal;

first subtracting means for subtracting said over-sample signal from said input signal to output a differential signal;

second sub-sampling means for sub-sampling said differential signal in the other direction of said two directions, to output a second coded signal having the same number of signal samples as said first coded signal; and second encoding means for encoding said second coded signal to output second coded data.

2. A hierarchical encoding apparatus for hierarchically encoding an image, said hierarchical encoding apparatus comprising:

first sub-sampling means for sub-sampling an input signal in a first direction of two directions consisting of a vertical direction and a horizontal direction, to output a first coded signal containing a number of signal samples which is fewer than a number of signal samples in said input signal;

first subtracting means connected to said first sub-sampling means so as to receive said first coded signal;

first encoding means for encoding a first predictive residual signal from said first subtracting means to output first coded data;

first local decoding means for decoding said first coded data to output a first local decoded signal;

first adding means for adding said first local decoded signal from said first local decoding means with a first local reproduced image signal of a frame which precedes a present frame to output a first local reproduced image signal of said present frame;

wherein said first subtracting means subtracts said first local reproduced image signal of said frame which precedes the present frame from said first coded signal outputted from said first sub-sampling means to output said first predictive residual signal;

first over-sampling means for interpolating said first local reproduced image signal outputted from said first adding means and outputting an over-sample signal containing the same number of signal samples as said input signal;

second subtracting means for subtracting said over-sample signal from said input signal to output a differential signal;

second sub-sampling means for sub-sampling said differential signal in the other direction of said two directions, to output a second coded signal having the same number of signal samples as said first coded signal;

third subtracting means connected to said second sub-sampling means so as to receive said second coded signal;

second encoding means for encoding a second predictive residual signal from said third subtracting means to output second coded data;

second local decoding means for decoding said second coded data to output a second local decoded signal; and second adding means for adding said second local decoded signal outputted from said second local decoding means with a second local reproduced image signal of said frame which precedes the present frame to output a second local reproduced image signal;

wherein said third subtracting means subtracts said second local reproduced image signal of said frame which precedes the present frame from said second coded signal outputted from said second sub-sampling means to output said second predictive residual signal.

3. A hierarchical decoding apparatus for decoding a hierarchically coded image, comprising first decoding means for decoding first coded data which has been hierarchically encoded, so as to output a first decoded signal;

first over-sampling means for interpolating said first decoded signal in a vertical direction to output a first over-sample signal containing the same number of signal samples as an original image signal;

second decoding means for decoding second coded data which has been hierarchically encoded, so as to output a second decoded signal;

second over-sampling means for interpolating said second decoded signal in a horizontal direction to output a second over-sample signal containing the same number of signal samples as said original image signal; and first adding means for adding said first over-sample signal and said second over-sample signal to output a final reproduced image signal.

4. A hierarchical decoding apparatus for decoding a hierarchically coded image, comprising:

first decoding means for decoding first coded data which has been hierarchically encoded, so as to output a first decoded signal;

first adding means for adding said first decoded signal supplied from said first decoding means and a first reproduced image signal of a frame which precedes a present frame to output a first reproduced image signal;

first over-sampling means for interpolating said first reproduced image signal supplied from said first adding means in a vertical direction to output a first over-sample signal containing the same number of signal samples as an original image signal;

second decoding means for decoding second coded data which has been hierarchically encoded, so as to output a second decoded signal;

second adding means for adding said second decoded signal supplied from said second decoding means and a second reproduced image signal of said frame which precedes the present frame to output a second reproduced image signal of a present frame;

second over-sampling means for interpolating said second reproduced image signal supplied from said second adding means in a horizontal direction to output a second over-sample signal containing the same number of signal samples as said original image signal; and third adding means for adding said first over-sample signal and said second over-sample signal to output a final reproduced image signal.

5. A hierarchical decoding apparatus comprising:

first decoding means for decoding first coded data which has been hierarchically encoded, so as to output a first decoded signal;

first over-sampling means for interpolating said first decoded signal in a vertical direction to output a first over-sample signal containing the same number of signal samples as an original image signal;

second decoding means for decoding second coded data which has been hierarchically encoded, so as to output a second decoded signal;

second over-sampling means for interpolating said second decoded signal in a horizontal direction to output a second over-sample signal containing the same number of signal samples as said original image signal;

first adding means for adding said first over-sample signal and said second over-sample signal to output a predictive signal;

frame memory means for delaying a reproduced image for one frame to output a previous-frame reproduced image signal;

motion compensation means for compensating a motion of the previous-frame reproduced image signal, according to a motion vector which is estimated from a reproduced image signal of the present frame and said previous-frame reproduced image signal, so as to output a motion compensated and reproduced image signal;

second adding means for adding the predictive signal and the motion compensated and reproduced image signal to output a final reproduced image signal.

6. A hierarchical encoding apparatus for hierarchically encoding an image, comprising:

motion vector estimation means for estimating a motion vector on the basis of an input signal and a local reproduced image signal of a frame which precedes a present frame;

motion compensation means for compensating a motion of said local reproduced image signal of said frame which precedes the present frame, according to said motion vector estimated in said motion vector estimation means to output a motion compensated local reproduced image signal;

first subtracting means for subtracting said motion compensated local reproduced image signal from said input signal to produce a predictive residual signal;

first sub-sampling means for sub-sampling said predictive residual signal in a vertical direction to output a first coded signal containing a number of signal samples which is fewer than a number of signal samples in said input signal;

first encoding means for encoding said first coded signal to output first coded data;

first over-sampling means for interpolating said first coded signal in a vertical direction to output a first over-sample signal containing the same number of signal samples as said input signal;

second subtracting means for subtracting said over-sample signal from said predictive residual signal to output a high band width component of the predictive residual signal;

second sub-sampling means for sub-sampling said high band width component of the predictive residual signal in a horizontal direction, to output a second coded signal having the same number of signal samples as said first coded signal;

second encoding means for encoding said second coded signal to output second coded data;

decoder means for decoding the second coded data to output decoded data;

second over-sampling means for interpolating said decoded data in a horizontal direction to output a second over-sample signal containing the same number of signal samples as said input signal; and adding means for adding said first over-sample signal and said second over-sample signal to output a reproduced predictive residual signal.

\* \* \* \* \*